United States Patent
Su et al.

(10) Patent No.: US 10,862,343 B2
(45) Date of Patent: Dec. 8, 2020

(54) METHOD AND APPARATUS FOR WIRELESS TRANSMISSION AND RECEPTION OF POWER

(71) Applicant: Atmosic Technologies Inc., Campbell, CA (US)

(72) Inventors: David Su, Saratoga, CA (US); Manolis Terrovitis, Athens (GR); Masoud Zargari, Irvine, CA (US); Jason Chih-way Hou, San Jose, CA (US); Teresa Huai-Ying Meng, San Francisco, CA (US)

(73) Assignee: Atmosic Technologies Inc., Saratoga, CA (US)

( * ) Notice: Subject to any disclaimer, the term of this patent is extended or adjusted under 35 U.S.C. 154(b) by 0 days.

(21) Appl. No.: 16/275,251

(22) Filed: Feb. 13, 2019

(65) Prior Publication Data

US 2019/0181688 A1    Jun. 13, 2019

Related U.S. Application Data

(62) Division of application No. 15/836,504, filed on Dec. 8, 2017, now abandoned.

(51) Int. Cl.
*H02J 50/20* (2016.01)
*H04B 5/00* (2006.01)
*H02J 50/40* (2016.01)

(52) U.S. Cl.
CPC ............ *H02J 50/20* (2016.02); *H04B 5/0031* (2013.01); *H04B 5/0037* (2013.01); *H04B 5/0062* (2013.01); *H02J 50/40* (2016.02)

(58) Field of Classification Search
CPC .. H04B 5/0031; H04B 5/0037; H04B 5/0062; H02J 50/20
See application file for complete search history.

(56) References Cited

U.S. PATENT DOCUMENTS

| | | |
|---|---|---|
| 6,323,775 B1 | 11/2001 | Hansson |
| 8,521,194 B2 | 8/2013 | Laroia et al. |
| 9,886,658 B1 | 2/2018 | Stanford et al. |
| 9,949,235 B2 | 4/2018 | Su et al. |
| 10,038,332 B1 | 7/2018 | Leabman et al. |
| 2007/0004464 A1 | 1/2007 | Lair et al. |
| 2009/0017843 A1 | 1/2009 | Laroia et al. |

(Continued)

OTHER PUBLICATIONS

U.S. Appl. No. 15/916,728, filed Mar. 9, 2018 (49 pgs.).

*Primary Examiner* — Md K Talukder
(74) *Attorney, Agent, or Firm* — Paradice & Li LLP

(57) ABSTRACT

Method and apparatus for wirelessly transmitting and receiving power between devices are provided. A first device may convert power into RF energy and transmit the RF energy to a second device. In some implementations, the first device may steer the RF energy using beamforming techniques to the second device. The second device may receive and convert the RF energy into power for the second device. In some implementations, the second device may be powered solely or in part by power transmitted by the first device. In some implementations, the first device may include two or more RF energy harvesters and a power combiner. The power combiner may combine power from the two or more RF energy harvesters to power the second device and/or charge a battery.

12 Claims, 8 Drawing Sheets

(56) References Cited

U.S. PATENT DOCUMENTS

| | | | |
|---|---|---|---|
| 2014/0003384 A1* | 1/2014 | Zhang | H04B 7/0413 |
| | | | 370/329 |
| 2014/0247152 A1* | 9/2014 | Proud | A61B 5/02055 |
| | | | 340/870.07 |
| 2015/0380974 A1 | 12/2015 | Lin et al. | |
| 2016/0118805 A1 | 4/2016 | Swope et al. | |
| 2016/0134150 A1 | 5/2016 | Chen et al. | |
| 2016/0285416 A1 | 9/2016 | Tiwari et al. | |
| 2017/0012090 A1* | 1/2017 | Hatano | H01L 51/0024 |
| 2017/0019851 A1 | 1/2017 | Mackenzie et al. | |
| 2017/0110910 A1* | 4/2017 | Zeine | H02J 50/80 |
| 2017/0117754 A1 | 4/2017 | Noori et al. | |
| 2017/0181110 A1* | 6/2017 | Belogolovy | H04W 52/58 |
| 2018/0191202 A1* | 7/2018 | Renneberg | H02J 50/20 |
| 2018/0233956 A1 | 8/2018 | Moussaoui et al. | |
| 2018/0316225 A1 | 11/2018 | Yeo et al. | |
| 2018/0335524 A1 | 11/2018 | Youssef | |
| 2019/0044392 A1* | 2/2019 | Chowdhury | H02J 50/80 |
| 2019/0074717 A1 | 3/2019 | Tsukamoto | |
| 2019/0181688 A1* | 6/2019 | Su | H04B 5/0031 |
| 2019/0181918 A1* | 6/2019 | Pagani | H02J 50/40 |
| 2019/0199145 A1* | 6/2019 | Zeine | H02J 50/23 |

* cited by examiner

METHOD AND APPARATUS FOR WIRELESS TRANSMISSION AND RECEPTION OF POWER

CROSS-REFERENCE TO RELATED APPLICATION

This application is a divisional application, and claims the benefit of co-pending and commonly owned U.S. patent application Ser. No. 15/836,504 entitled "METHOD AND APPARATUS FOR WIRELESS TRANSMISSION AND RECEPTION OF POWER," filed on Dec. 8, 2017, which is hereby incorporated by reference in its entirety.

TECHNICAL FIELD

The present embodiments relate generally to wireless devices, and specifically to methods and apparatus for wireless transmission and reception of power between wireless devices.

BACKGROUND OF RELATED ART

Portable devices (such as wireless communication devices, wireless sensors, and IoT devices) are often battery powered to provide mobility and convenience. Reducing the power consumption of wireless communication devices may extend battery life and thereby increase the time between battery recharging or replacement. Due to size constraints, portable devices typically include batteries having very limited power capacities or, in some instances, may not include any battery.

Thus, there is a need to wirelessly transfer power to devices with limited on-board power resources.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus and method are disclosed that may allow power to be wirelessly transmitted between wireless communication devices. In a first example, a wireless device for transmitting power to a second wireless device is disclosed and may include an antenna, a transceiver coupled to the antenna configured to transmit one or more radio frequency pre-charging pulses for power harvesting at the second wireless device, and transmit a target identification value to identify the second wireless device.

In another example, another wireless device is disclosed and may include an antenna, a transceiver coupled to the first antenna and configured to decode a target identification (ID) value included in a received RF signal, the transceiver comprising a plurality of energy harvesting units configured to convert the received RF signal into power for at least a portion of the device, and a controller configured to assert a signal in response to matching the target ID with a device ID that identifies the device.

In another example, a method for operating a wireless device is disclosed and may include determining a location of a second wireless device, determining beamforming parameters based on the determined location, and transmitting a beamformed paging signal to provide power to the second wireless device.

BRIEF DESCRIPTION OF THE DRAWINGS

Aspects of the present disclosure are illustrated by way of example and are not intended to be limited by the figures of the accompanying drawings. Like numbers reference like elements throughout the drawings and specification.

DETAILED DESCRIPTION

Figure 1:
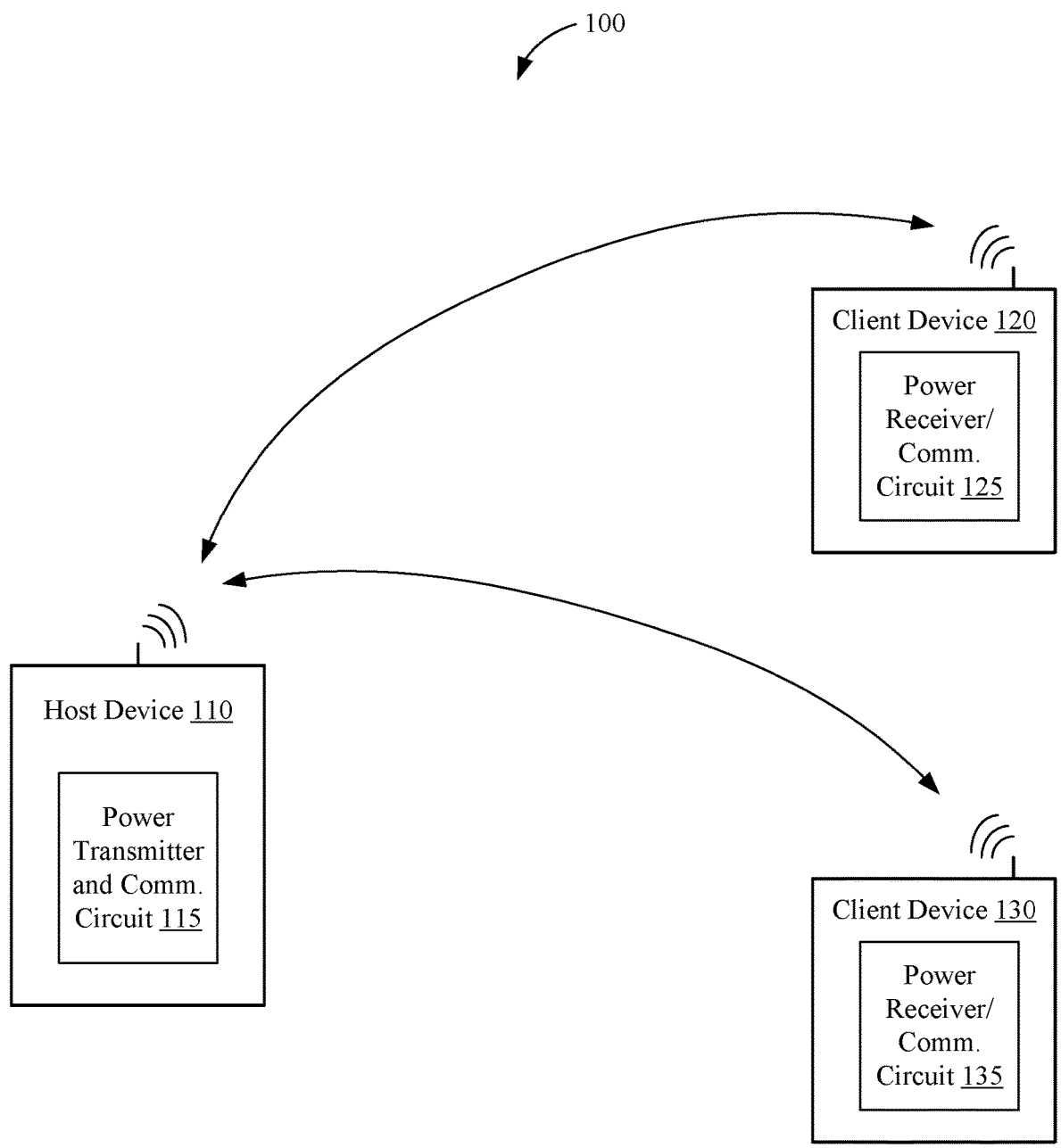
FIG. 1 depicts a wireless communication system within which example embodiments may be implemented.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

FIG. 1 depicts a wireless communication system 100 within which aspects of the present disclosure may be implemented. The wireless communication system 100 may include one or more wireless communication devices such as a host device 110 and client devices 120 and 130. The host device 110 and the client devices 120 and 130 may be any suitable wireless communication device. Example wireless communication devices may include a cell phone, personal digital assistant (PDA), tablet device, laptop computer, or any other suitable portable device. The host device 110 and the client devices 120 and 130 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

For ease of explanation and clarity, the wireless communication system 100 depicts a single host device 110 and two client devices 120 and 130. In other embodiments, the wireless communication system 100 may include any technically feasible number of host devices and/or client devices. The host device 110 and the client devices 120 and 130 may communicate with each other via one or more technically feasible wireless communication protocols. In some implementations, the host device 110 and the client devices 120 and 130 may communicate with each other (and with other devices not shown for simplicity) via Wi-Fi, Bluetooth®, Bluetooth Low Energy (BLE), Long Term Evolution (LTE), or any other suitable communication protocol. In some other implementations, the host device 110 and client devices 120 and 130 may operate within the 900 MHz band, the 2.4 GHz industrial, scientific, and medical (ISM) band, the 5 GHz ISM band, the 60 GHz band or any other technically feasible frequency band.

In some implementations, the client devices 120 and 130 may be battery powered (or may receive power from external power sources), and may be capable of operating in a number of different power modes or states. In some aspects, client devices 120 and 130 may operate in either a low-power state or an active power state. In the low-power state, operations of one or more portions of the client devices 120 and 130 may be suspended and/or one or more circuits and components of the client devices 120 and 130 may be powered down to reduce power consumption. In the active power state, portions of the client devices 120 and 130 that were powered down during the low-power state may be powered on, for example, so that the client devices 120 and 130 are fully operational (such as being capable of transmitting signals, receiving signals, and processing signals).

In some other implementations, the client devices 120 and 130 may not be battery or alternating current (AC) powered, but may instead derive power from transmitted RF energy. For example, the client devices 120 and 130 may be small, remote devices for which battery and/or external power sources are not feasible, available, or desirable. In some aspects, the client devices 120 and 130 may be environmental sensors (such as temperature sensors, air pressure sensors, humidity sensors, and the like), door position sensors, window position sensors, and the like. In other aspects, the client devices 120 and 130 may be any suitable IoT device (such as sensors, motion detectors, relay devices, and so on).

In some implementations, the client device 120 may include a power receiver/communication circuit 125. The power receiver/communication circuit 125 may receive RF energy from the host device 110 (or any other nearby device that transmits or emits RF energy), and convert the RF energy into power (such as voltage/current) for the client device 120. In this manner, some of the operations of the client device 120 may be powered by RF energy transmitted from the host device 110. In addition, the power receiver/communication circuit 125 may provide communication functionality for the client device 120. For example, the power receiver/communication circuit 125 may include a transceiver to wirelessly transmit and receive data between the client device 120 and the host device 110, between the client device 120 and the client device 130, and/or between the client device 120 and one or more other wireless devices (not shown for simplicity). Similar to the client device 120, the client device 130 may also include a power receiver/communication circuit 135 to convert RF energy into power and provide communication functionality.

In some implementations, the host device 110 may be powered by a battery or through an external power source, for example, and well suited to transmit power via RF energy to the client devices 120 and/or 130. In some implementations, the host device 110 may include a power transmitter/communication circuit 115. The power transmitter/communication circuit 115 may convert power from a local power source (such as battery power and/or an external power source, not shown for simplicity) into RF energy that may be transmitted to other wireless devices (such as the client devices 120 and 130). In addition, the power transmitter/communication circuit 115 may provide communication functionality for the host device 110. For example, the power transmitter/communication circuit 115 may include a transceiver to wirelessly transmit and receive data between the host device 110 and a number of other devices (such as the client devices 120 and 130).

In some implementations, the power transmitter/communication circuit 115 may transmit a paging signal to the client devices 120 and 130. The paging signal may include one or more RF pre-charging pulses. The RF pre-charging pulses may be pulses of RF energy that may be used to power, at least partially, the client devices 120 and 130. In addition, the paging signal may include a target identification (ID) field or value that identifies or addresses a specific device, such as the client device 120 or the client device 130. In some implementations, the target ID may be a MAC address, an IP address, or any other number or value that may be associated with and/or used to identify or address the client device 120 and/or the client device 130.

In some implementations, the target ID may be a group ID associated with a group of client devices (such as devices that share a common device class, a common family, and/or a common location), for example, so that the paging signal may identify or address a group of client devices. In some aspects, the target ID may correspond to client devices that are located in a common area. In other aspects, the target ID may correspond to client devices that perform a similar function. In some other implementations, the target ID may be a broadcast ID that allows the paging signal to identify or address all client devices within wireless range of the host device 110.

Portions of the paging signal (such as the RF pre-charging pulses and/or the target ID) may power at least a portion of a client device. In some implementations, the paging signal may be used to wake-up one or more other devices (such as the client devices 120 and 130). The client devices 120 and 130 each may determine whether the paging signal is addressed to or identifies the respective client device. If the paging signal addresses or identifies a given client device, then the given client device may transition from the low power state to the active power state, for example, based on reception of the paging signal identifying the client device. Conversely, if the paging signal does not address or identify the given client device, then the given client device may remain in its current power state (such as not transitioning from the low power state to the active power state).

As described above, the host device 110 may provide power to the client devices 120 and 130 by transmitting RF energy. In some instances, the client device 120 or 130 may include a power storage device that is running low on charge. In response, the client device 120 or 130 may request that the host device 110 increase the amount of transmitted RF energy, even in conditions when the host device 110 has no data to transmit.

In some aspects, the paging signal may be transmitted within frequency bands that may be shared with other transceivers provided within the client devices 120 and 130, respectively. For one example, the client devices 120 and 130 may include one or more transceivers (including Wi-Fi and Bluetooth transceivers) that operate within a 6 MHz, a 13 MHz, a 27 MHz, a 40 MHz, a 400 MHz, a 900 MHz, a 2.4 GHz, a 5 GHz, and a 60 GHz industrial, scientific, and medical (ISM) band. In another example, the client devices 120 and 130 may include one or more cellular transceivers that operate within various frequency bands (some of which may overlap frequency bands used by the one or more Wi-Fi and/or Bluetooth transceivers). Thus, the paging signal and the power receiver/communication circuits 125 and 135 of respective client devices 120 and 130 may share an ISM band used by other transceivers of the respective client devices 120 and 130.

In some implementations, the paging signal may not be associated with any commercially available communication protocol (such as Wi-Fi and Bluetooth communication protocols), but instead may be based on a signaling technique independent of commercially available communication protocols (such as a proprietary or military communication protocol). In some implementations, the paging signal may be transmitted on frequencies used by one or more commercially available communication protocols. In some other implementations, the paging signal may be transmitted on frequencies different from the frequency bands used by commercially available communication protocols. Example paging signals are described in more detail below in conjunction with FIGS. 4A-4C.

Figure 2:
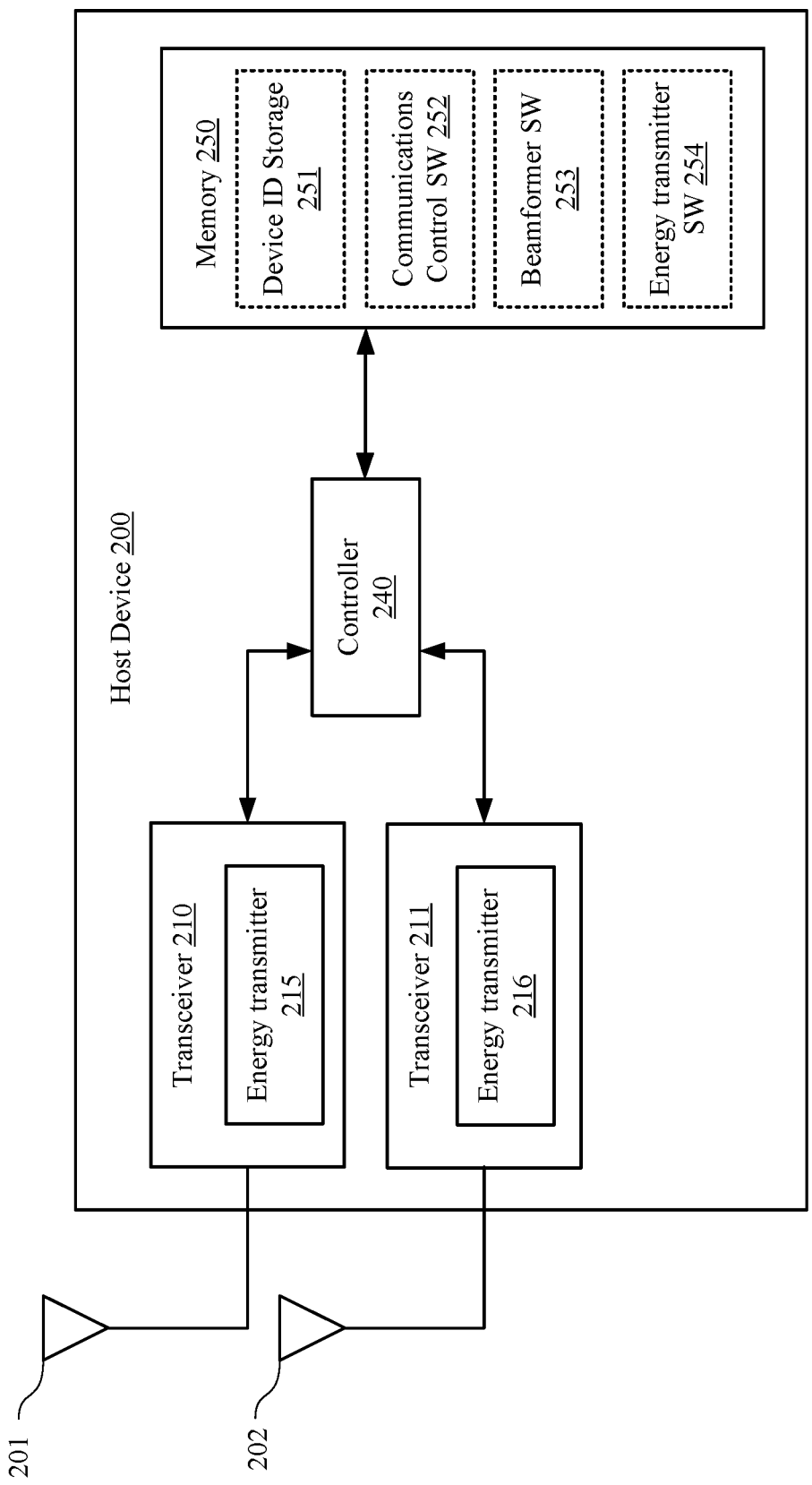
FIG. 2 is a block diagram of an example host device.

FIG. 2 is a block diagram of an example host device 200. The host device 200 may be an implementation of the host device 110 of FIG. 1. The host device 200 may include antennas 201 and 202, transceivers 210 and 211, a controller 240, and a memory 250. Although two antennas and two transceivers are shown in the example of FIG. 2, in other implementations, the host device 110 may include any feasible number of antennas and transceivers. For example, the host device 110 may include a single antenna and transceiver, or may include three or more antennas and transceivers. The transceiver 210 may be coupled directly or indirectly to antenna 201, and the transceiver 211 may be coupled directly or indirectly to antenna 202. The transceivers 210 and 211 may be implementations of the power transmitter and communication circuit 115 of FIG. 1.

Transceiver 210 may transmit data to and receive data from other wireless devices. For example, the transceiver 210 may operate in accordance with the IEEE 802.11 family of standards, the Bluetooth protocol, the Bluetooth Low Energy protocol, or any other feasible communication protocol. In addition, the transceiver 210 may include an energy transmitter 215. The energy transmitter 215 may convert power from a local power source (such as a battery, power supply, or the like, not shown for simplicity) into RF energy that may be wirelessly transmitted to other devices via the antenna 201. The transmitted RF energy may be received by another wireless device, and converted into power that may be used to power some or all of the other wireless device. In a similar manner, the transceiver 211 may also transmit and receive wireless data, and may also include an energy transmitter 216 to transmit power (such as described above with respect to the transmitter 215).

In some implementations, the transceivers 210 and 211 may operate together to provide multiple-input multiple-output (MIMO) and/or steered (beamformed) data communications. In a similar manner, the energy transmitters 215 and 216 may operate together to transmit steered (beamformed) power to other wireless devices.

The memory 250 may include a device ID storage 251 to store one or more device IDs. In some implementations, a device ID may be used as the target ID to identify one or more specific wireless devices (such as the host device 200, the client devices 120 and/or 130). The device ID may be a MAC address, an IP address, or any other number or value that may be associated with and/or used to identify or address a particular wireless device.

Further, the memory 250 may include a non-transitory computer-readable storage medium (such as one or more nonvolatile memory elements, such as EPROM, EEPROM, Flash memory, a hard drive, etc.) that may store the following software (SW) modules:

a communications control SW module 252 to control wireless transmission and reception operations of the transceivers 210 and 211, for example, as described below for one or more operations of FIG. 5;
  a beamforming SW module 253 to determine positions of other wireless devices and direct the transceivers 210 and 211 to transmit beamformed data and/or RF energy pulses to the determined positions, for example, as described below for one or more operations of FIG. 5; and an energy transmitter SW module 254 to manage operation of the energy transmitters 215 and 216, for example, as described below for one or more operations of FIG. 5.

In some implementations, one or more of the software modules may be executed as a user application program. Each software module includes program instructions that, when executed by the controller 240, may cause the host device 200 to perform the corresponding function(s). Thus, the non-transitory computer-readable storage medium of memory 250 may include instructions for performing all or a portion of the operations of FIG. 5.

The controller 240, which may be coupled to the transceivers 210 and 211 and the memory 250, may be any one or more suitable controllers or processors capable of executing scripts or instructions of one or more software programs stored in the host device 200 (e.g., within the memory 250). In some embodiments, the controller 240 may be implemented with a hardware controller, a processor, a state machine, or other circuits to provide the functionality of the controller 240 executing instructions stored in the memory 250.

The controller 240 may execute the communications control SW module 252 to transmit and receive data via the transceivers 210 and 211. In some implementations, execution of the communications control SW module 252 may enable the host device 200 to transmit and receive data (including MIMO and beamformed data) to and from other devices, and to transmit a non-beamformed paging signal and/or a beamformed paging signal to a particular device (such as one of the client devices 120 and 130) using the device IDs stored in the device ID storage 251. In some implementations, execution of the communications control SW module 252 may enable the host device 200 to receive a request from a client device to transmit RF energy.

The controller 240 may execute the beamforming SW module 253 to determine locations of other wireless devices (such as the client devices 120 and 130). Execution of the beamforming SW module 253 may also determine beamforming parameters (such as channel coefficients and/or transceiver control settings) to transmit data and/or paging signals as beamformed transmissions to the client devices 120 and 130 via the transceivers 210 and 211. In some implementations, execution of the beamforming SW module 253 may cause one or more sounding packets (such as null data packets NDPs) to be transmitted from the host device to one or both of the client devices 120 and 130. In addition, execution of the beamforming SW module 253 may enable analysis of feedback data (such as channel state information sent in response to the sounding packets) from other devices. The feedback data may be used to determine the beamforming parameters (which may include a beamforming steering matrix). In some implementations, the feedback data may also include a request from a client device to transmit RF energy.

The controller 240 may execute the energy transmitter SW module 254 to control the energy transmitters 215 and 216. In some implementations, execution of the energy transmitter SW module 254 may cause the energy transmitters 215 and 216 to generate and transmit one or more RF energy pulses (including RF pre-charging pulses) to other devices. In some implementations, the RF energy pulses may be beamformed and directed to particular client devices, for example, based on their determined positions and using their corresponding device IDs. In other implementations, the RF energy pulses may not be beamformed but rather transmitted in multiple directions. In some aspects, the RF energy pulses may be included within a paging signal. In other aspects, the RF energy pulses may be included within other suitable signals (such as unicast packets, multi-cast packets, and/or broadcast packets).

Figure 3:
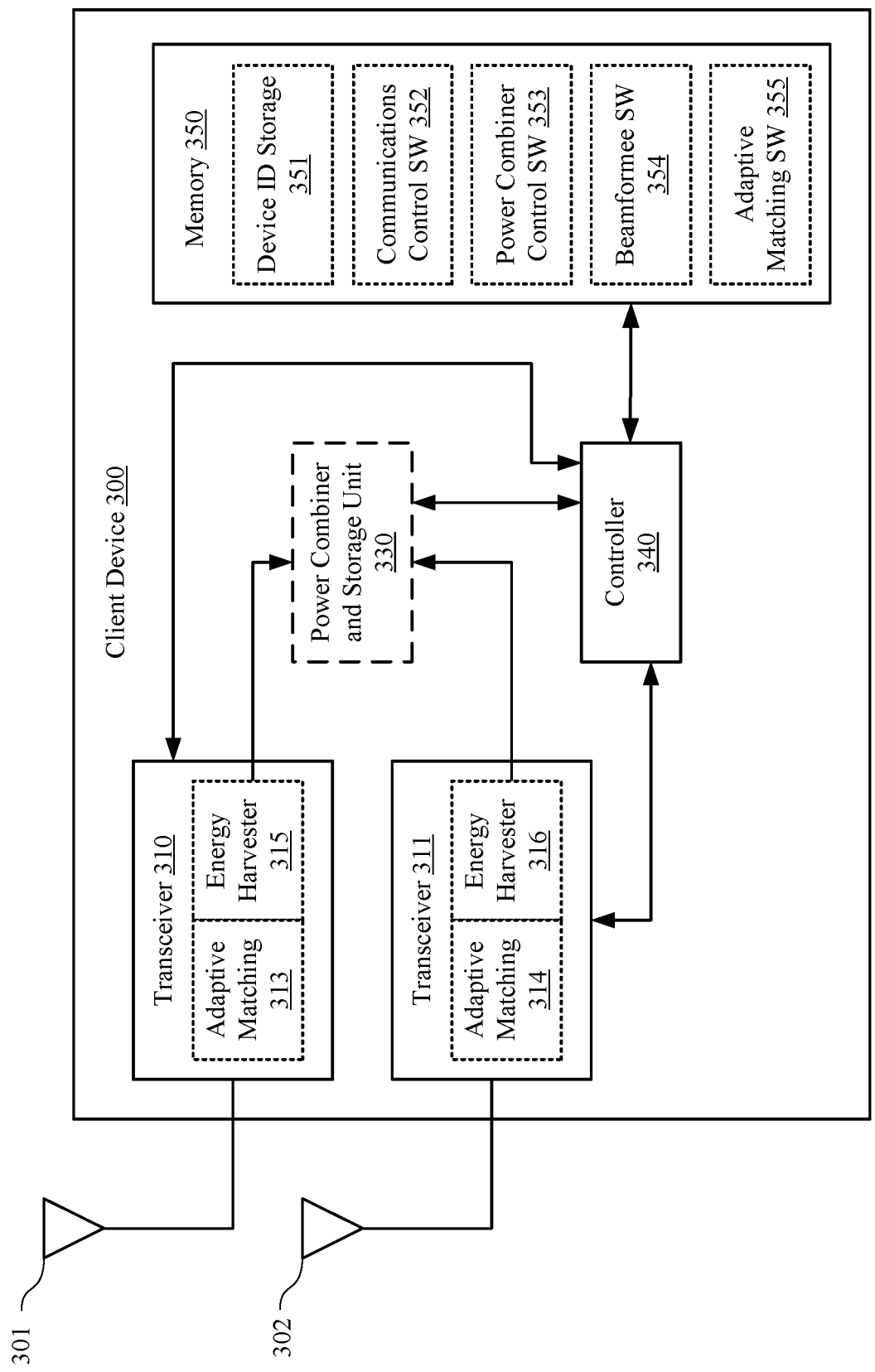
FIG. 3 is a block diagram of an example client device.

FIG. 3 is a block diagram of an example client device 300. The client device 300 may be an implementation of the client device 120 and/or the client device 130 of FIG. 1. The client device 300 may include antennas 301 and 302, transceivers 310 and 311, a power combiner and storage unit 330, a controller 340, and a memory 350. Although two antennas and two transceivers are shown in the example of FIG. 3, in other implementations, the client device 300 may include any feasible number of antennas and transceivers. The transceiver 310 may be coupled directly or indirectly to the antenna 301, and the transceiver 311 may be coupled directly or indirectly to the antenna 302. The transceivers 310 and 311 may be implementations of the power receiver/communication circuits 125 and 135 of respective client devices 120 and 130 of FIG. 1.

Similar to the transceivers 210 and 211 of FIG. 2, the transceivers 310 and 311 may transmit and receive wireless data from other wireless devices, including the host device 200. In addition, the transceivers 310 and 311 may receive a paging signal containing an encoded target ID that identifies or addresses the client device 300. The transceiver 310 and/or the transceiver 311 may decode the target ID and provide the decoded target ID to the controller 340. Upon reception of a paging signal addressed to the client device 300 (which may be determined by comparing the decoded target ID with a stored ID specific to the client device 300), the transceiver 310 or 311 may assert a signal through the controller 340 that may be used to transition the client device from a first operating state to a second operating state (such as from the low power state to the active power state).

The transceiver 310 may include an adaptive matching unit 313 and an energy harvester 315. The energy harvester 315 may receive RF energy from the adaptive matching unit 313, and convert the RF energy into a power (voltage/current) to power, at least partially, the client device 300. The adaptive matching unit 313 may be coupled to the antenna 301, and may be controlled at least in part by the energy harvester 315. In some implementations, the energy harvester 315 may sense a voltage (such as the average voltage, the peak-to-peak voltage, or any other feasible voltage measurement) from the antenna 301 and cause the adaptive matching unit 313 to increase an amplitude of the RF signal provided to the energy harvester 315, for example, to increase the amount of power that may be converted by the energy harvester 315. In this manner, received RF energy may be recovered from the RF pre-charging pulses transmitted by the host device 200. Similarly, the transceiver 311 may include an adaptive matching unit 314 and an energy harvester 316 to receive RF energy from the antenna 302 and convert the RF energy into power.

The power combiner and storage unit 330 may receive power from the energy harvesters 315 and 316. The power combiner and storage unit 330 may combine the power from the energy harvesters 315 and 316 to provide more voltage and/or current than may be available from a single energy harvester. In some implementations, the power combiner and storage unit 330 may accumulate power from the energy harvesters 315 and 316. For example, the energy harvesters 315 and 316 may harvest power from RF signals and may accumulate the harvested power until power is needed by the client device 300. In some other implementations, the power combiner and storage unit 330 may include a battery to accumulate the harvested power (battery not shown for simplicity). In this manner, the power combiner and storage unit 330 may receive power from the energy harvesters 315 and 316 to charge the included battery.

In some implementations, different energy harvesters may be optimized to operate within different frequency ranges. For example, the energy harvester 315 may be optimized to convert RF energy within a 900 MHz frequency band, while the energy harvester 316 may be optimized to convert RF energy with the 2.4 GHz band. The inclusion of multiple energy harvesters optimized for different frequency bands may enable the client device 300 to more efficiently convert RF energy into power from a wider range of frequencies, for example, as compared with a client device that includes only one energy harvester).

In some other implementations, the energy harvesters 315 and 316 may both be optimized to convert RF energy within the same frequency band. For example, the energy harvesters 315 and 316 may both be optimized to operate in the 2.4 GHz frequency band. The location of the antennas 301 and 302 and/or the energy harvesters 315 and 316 may enable the energy harvesters 315 and 316 to receive a correlated RF signal (based on wavelength and/or the relative location of the RF transmitter). The energy harvesters 315 and 316 may generate power from the correlated RF signals, and the power combiner and storage unit 330 may combine the generated power.

In another implementation, the energy harvesters 315 and 316 may be configured to receive different power levels of RF signals. For example, the energy harvester 315 may be configured to receive RF signals between −20 dBm and −30 dBm and the energy harvester 316 may be configured to receive signals between 0 dBm to −10 dBm. In this manner, different energy harvesters may be used to receive relatively strong RF signals and relatively weak RF signals. The use of separate energy harvesters configured for different RF power levels may involve a trade-off between sensitivity and circuit complexity. For example, an energy harvester configured to receive and convert relatively strong RF signals into power may have less sensitivity than energy harvesters configured to receive and convert relatively weak RF signals into power. In contrast, an energy harvester configured to receive and convert relatively weak RF signals into power may include additional circuitry to provide protection from strong RF signals.

The memory 350 may include a device ID storage 351 to store a device ID. In some implementations, a device ID may be used as a target ID to identify a specific wireless device (such as the client device 300). The device ID may be a MAC address, an IP address, or any other number or value that may be associated with and/or used to identify or address the client device 300.

Further, the memory 350 may include a non-transitory computer-readable storage medium (such as one or more nonvolatile memory elements, such as EPROM, EEPROM, Flash memory, a hard drive, etc.) that may store the following software (SW) modules:

- a communications control SW module 352 to control wireless transmission and reception operations of the communication transceivers 310 and 311, for example, as described below for one or more operations of FIG. 6;
- a power combiner control SW module 353 to control operation of the power combiner and storage unit 330, for example, as described below for one or more operations of FIG. 6;
- a beamformee SW module 354 to respond to sounding packets received by the client device 300, for example, as described below for one or more operations of FIG. 6; and
- an adaptive matching SW module 355 to control operation of adaptive matching units 313 and 314, for example, as described below for one or more operations of FIG. 6.

The controller 340, which may be coupled to the transceivers 310 and 311, the power combiner and storage unit 330, and the memory 350, may be any one or more suitable controllers or processors capable of executing scripts or instructions of one or more software programs stored in the client device 300 (e.g., within the memory 350). In some embodiments, the controller 340 may be implemented with a hardware controller, a processor, a state machine or other circuits to provide the functionality of the controller 340 executing instructions stored in the memory 350.

The controller 340 may execute the communications control SW module 352 to transmit and receive data via the transceivers 310 and 311. In some implementations, execution of the communications SW module 352 may enable the client device 300 to transmit and receive data (including MIMO and beamformed data) to and from other devices, and to receive a paging signal (such as a paging signal transmitted from the host device 110). In some implementations, execution of the communication SW module 352 may enable the controller 340 to compare the target ID encoded in the received paging signal with the device ID stored in the device ID storage 351. If the target ID matches the device ID, then the controller 340 may assert a signal and transition the client device 300 from a first operating state to a second operating state (such as from a low power state to an active power state). Execution of the communications SW module 352 may enable the client device 300 to request a transmission of RF energy. For example, stored power in the power combiner and storage unit 330 may be at a low level (a level less than a threshold). In response, a request for a transmission of RF energy may be transmitted to other devices, such as the host device 200 of FIG. 2.

The controller 340 may execute the power combiner control SW module 353 to cause or instruct the power combiner and storage unit 330 to combine and/or accumulate power (voltage and/or current) provided from the energy harvesters 315 and 316. In some implementations, execution of the power combiner control SW module 353 may cause or instruct the power combiner and storage unit 330 to accumulate power, for example, by charging a battery.

The controller 340 may execute the beamformee SW module 354 to respond to sounding packets and to provide feedback data that may enable a host device to determine beamforming parameters associated with the client device 300. In some implementations, the beamforming parameters may enable the host device 110 to transmit beamformed paging signals and/or data signals to the client device 300. In some aspects, the feedback data may include channel state information from which the host device 110 may determine a beamforming steering matrix. In some implementations, the feedback data may include a request for a transmission of RF energy.

The controller 340 may execute the adaptive matching SW module 355 to respond to RF signals received through one or both of the antennas 301 and 302. Execution of the adaptive matching SW module 355 may sense an amplitude of the received RF signal and adjust one or more operating parameters (such as control voltages, bias voltages, and the like) of the adaptive matching units 313 and 314 to increase a magnitude of the received RF signal. Increasing the RF signal magnitude may increase an operating efficiency of associated energy harvesters 315 and 316.

As described above with respect to FIGS. 1-3, a received RF signal may include a paging signal. The paging signal may include RF pre-charging pulses and data fields. The RF pre-charging pulses may provide RF energy in advance of the data fields to enable the energy harvester 315 and/or the energy harvester 316 to generate power for at least a portion of the client device 300, for example, to receive the data fields of the RF signal. Some example implementations of paging signals are described below with respect to FIGS. 4A-4C.

Figure 4A:
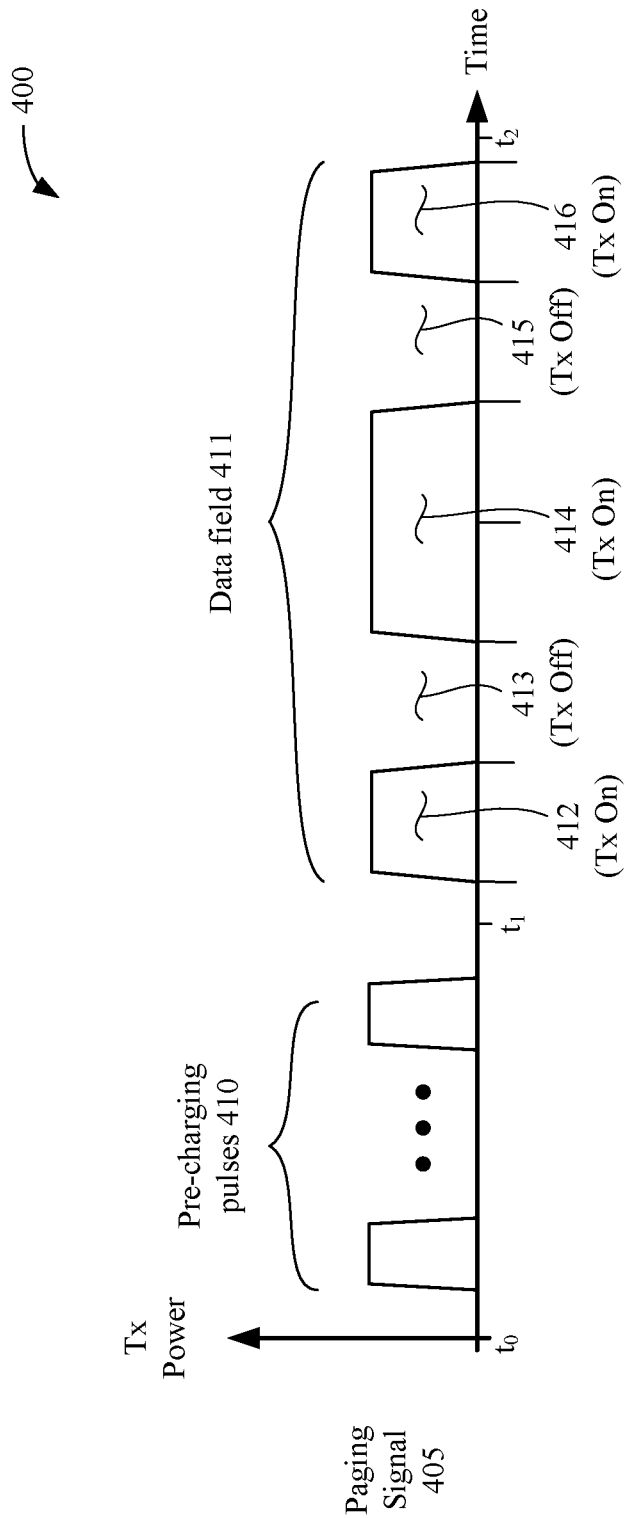
FIGS. 4A-4C are diagrams of example implementations of paging signals.

FIG. 4A is a diagram 400 depicting one implementation of a paging signal 405 that may be transmitted by the host device 200 of FIG. 2 to the client device 300 of FIG. 3. In some implementations, the paging signal 405 may include one or more RF pre-charging pulses 410 and a data field 411. Although only two RF pre-charging energy pulses 410 are shown in the paging signal 405, in other embodiments, the paging signal 405 may include any number of RF pre-charging energy pulses. The RF pre-charging pulses 410 may provide power for one or more portions of the client device 300. The RF pre-charging pulses 410 may be transmitted during a first time period (such as between times $t_0$-$t_1$).

In some aspects, the data field 411 may include an encoded target ID and/or any other feasible data for transmission during a second time period (such as between times $t_1$-$t_2$). In some implementations, the data field 411 may be encoded via an on-off keying (OOK) modulation technique. On-off keying uses the presence and absence of RF energy to encode and transmit data. In some aspects, the host device 110 may generate RF energy to indicate a first logical state (e.g., a logical one), and may not generate RF energy to indicate a second logical state (e.g., a logical zero). In other aspects, the host device 110 may generate RF energy to indicate a logical zero, and may not generate RF energy to indicate a logical one. During the transmission of RF energy associated with the paging signal 405, the host device 200 may not need to modulate the transmitted RF energy according to Wi-Fi, Bluetooth, BLE, or other communication protocols. Instead, the host device 200 may transmit an unmodulated carrier signal within a frequency band from which the client device 300 may detect a presence (or absence) of RF energy.

As an example, the host device 200 may generate and transmit RF energy via RF envelopes 412, 414, and 416. Using OOK, the RF envelopes 412, 414, and 416 may represent logical ones, and a lack of RF energy during periods or time slots 413 and 415 may represent logical zeros. In other implementations, the RF envelopes 412, 414, and 416 may represent logical zeros, and a lack of RF energy during periods or time slots 413 and 415 may represent logical ones. In the example of FIG. 4A, the RF envelopes 412, 414, and 416 may encode a target ID of 101101.

In the example paging signal 405, the RF pre-charging pulses 410 and the data field 411 are illustrated as being transmitted at the same power level. An average effective isotropic radiated power (EIRP) of the paging signal 405, based on the transmit power level of the RF pre-charging pulses 410 and the data field 411, may be less than a regulatory limit. As illustrated in FIG. 4A, the paging signal 405 may include discontinuous RF energy bursts. Thus, the RF energy bursts may be interspersed with periods of no or relatively low RF energy. This arrangement of RF energy bursts may enable the peak-to-average power ratio of the paging signal 405 to be less than the regulatory limit, although some portions of the paging signal 405 may instantaneously exceed the regulatory limit.

In some implementations, the RF pre-charging pulses 410 may be omitted from the paging signal 405, for example, leaving only the data field 411 in the paging signal 405. The RF energy within the data field 411 may be harvested and used to power the client device 300 in a manner similar to the RF energy within the RF pre-charging pulses 410. For example, the data field 411 may include RF envelopes (RF energy) that encode a target ID. The data field 411 (the target ID RF envelopes) may be received by, and provide power for, the client device 300. The client device 300 may also decode the data field 411 to receive the transmitted target ID.

In some implementations, the RF pre-charging pulses 410 may be transmitted in a different frequency band than the data field 411. For example, the RF pre-charging pulses 410 may be transmitted within a 900 MHz frequency band, while the data field 411 may be transmitted within a 2.4 GHz or 5 GHz frequency band. In this manner, the propagation properties of a first frequency band may be used to transmit power, while the propagation properties of a second frequency band may be used to transmit data. Moreover, transmitting the RF pre-charging pulses 410 and the data field 411 in different frequency bands may reduce interference of the data field 411.

In some other implementations, the RF pre-charging pulses 410 and the data field 411 may be transmitted within a similar or shared frequency band. In these other implementations, the antennas and other RF components of the associated transceivers and energy harvesters of a client device may be optimized for a single frequency band and shared between the transceivers and the energy harvesters.

In still other implementations, the RF pre-charging pulses 410 may be transmitted according to a first communication protocol, and the data field 411 may be transmitted according to a second communication protocol (different than the first communication protocol). For example, the RF pre-charging pulses 410 may be transmitted according to a Wi-Fi communication protocol, and the data field 411 may be transmitted according to a Bluetooth protocol. In this implementation, relatively high power RF pre-charging pulses 410 may be transmitted to provide power to a client device, while relatively lower power data fields 411 may be used to transmit data to the client device.

Figure 4B:
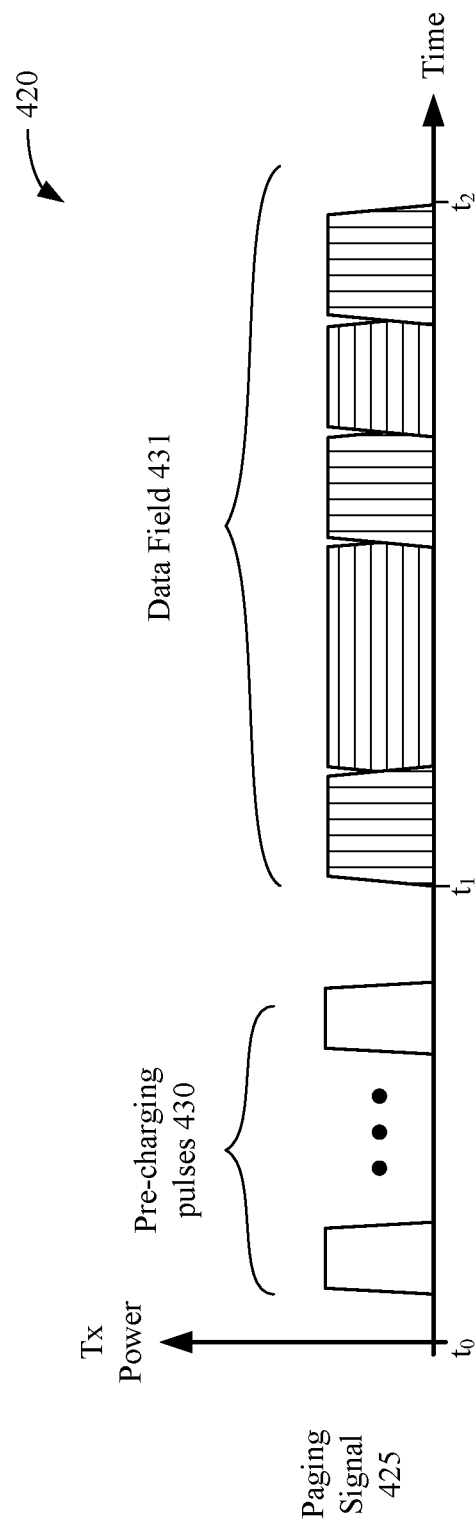

FIG. 4B is a diagram 420 depicting another implementation of a paging signal 425 that may be transmitted by the host device 200 of FIG. 2 to the client device 300 of FIG. 3. The paging signal 425 may include one or more RF pre-charging pulses 430 transmitted during a first time period (between times t0-t1), and may include a data field 431 transmitted during a second time period (between times t1-t2). In some implementations, the data field 431 may consist of continuous or relatively continuous RF energy transmitted between times t1-t2. Although an increased amount of RF energy may be transmitted (as compared to the paging signal 405 of FIG. 4A), the transmit power of the paging signal 425 may be selected to provide an average EIRP less than or equal to a regulatory limit.

Figure 4C:
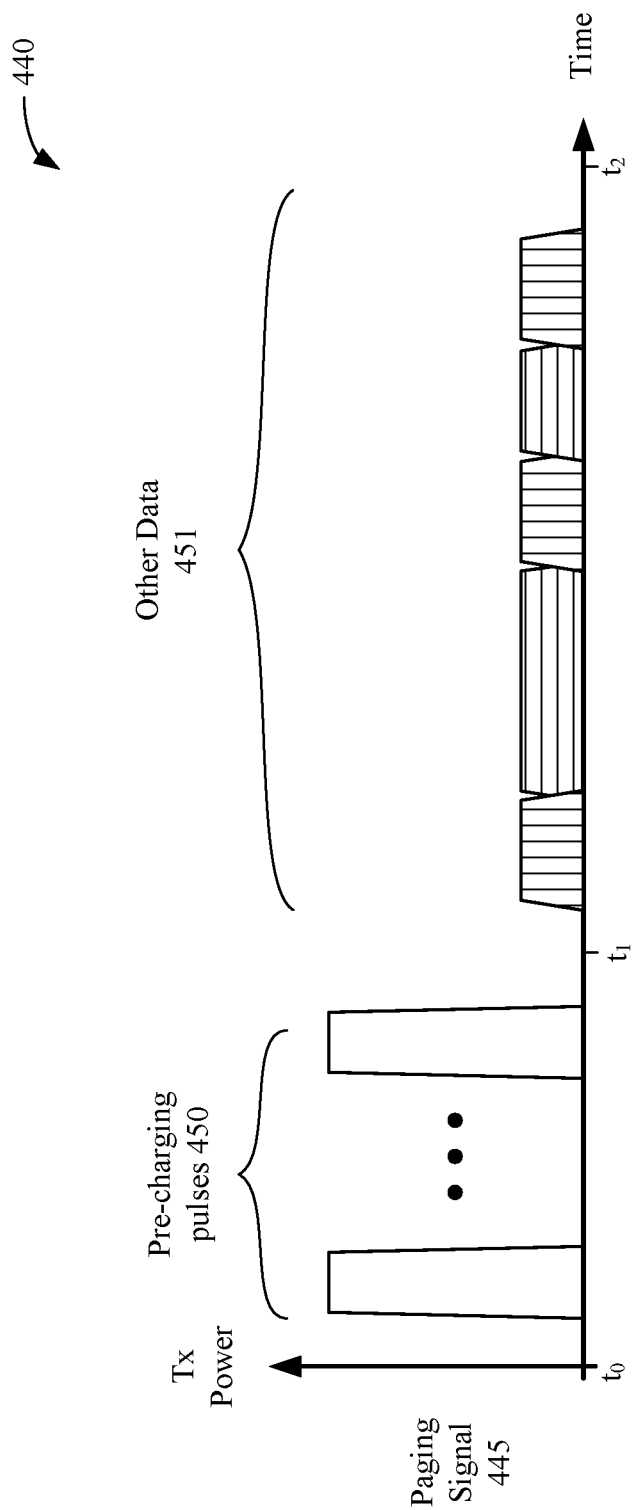

FIG. 4C is a diagram 440 depicting another implementation of a paging signal 445 that may be transmitted by the host device 200 of FIG. 2 to the client device 300 of FIG. 3. The paging signal 445 may include one or more RF pre-charging pulses 450 transmitted during a first time period (between times t0-t1), and may include a data field 451 transmitted during a second time period (between times t1-t2). The transmit power associated with the RF pre-charging pulses 450 may be much greater (such as by more than a threshold amount) than the transmit power associated with the data field 451. In some implementations, the transmit power of the RF pre-charging pulses 450 may exceed a regulatory limit or threshold. However, by controlling a transmit duty cycle of the paging signal 445 (transmission times of RF pre-charging pulses 450 vs transmission times of data fields 451), the overall EIRP of the paging signal 445 may be maintained within regulatory limits. The larger transmit power of the RF pre-charging pulses 450 (as compared with the transmit power of the data fields 451) may enable energy harvesters within the client device 300, such as the energy harvesters 315 and 316 of FIG. 3, to convert and/or accumulate power for the client device 300 prior to receiving the data fields 451. In some implementations, the peak-to-average power ratio of the paging signal 445 may be less than the regulatory limit, although some portions of the paging signal 445 may instantaneously exceed the regulatory limit.

Figure 5:
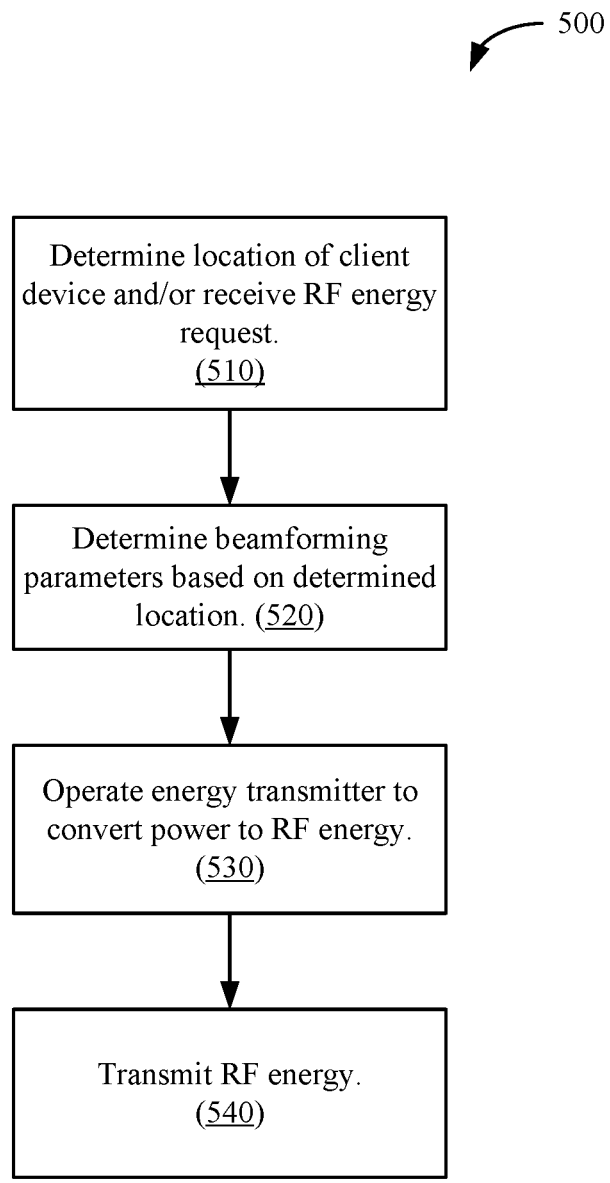
FIG. 5 is a flowchart depicting an example operation for operating a host device, in accordance with some embodiments.

FIG. 5 is a flowchart depicting an example operation 500 for operating a host device, in accordance with some embodiments. Although described herein as being performed by the host device 200 of FIG. 2, the operation 500 may be performed by the host device 110 of FIG. 1, or by any other suitable device. The operation begins as the host device 200 determines a location of a client device and/or receives a request for RF energy (510). In some implementations, the transceivers 210 and 211 of the host device 200 may transmit one or more sounding packets to determine the location of the client device. The client device may use the sounding packet to determine channel conditions or channel state information (CSI), and send a feedback frame containing the determined channel conditions or the CSI to the host device 200. In some other implementations, the host device 200 may receive a request for an RF energy transmission from a client device (such as client device 300).

Next, the host device 200 determines beamforming parameters based on the determined location of the client device (520). In some implementations, the host device may determine the beamforming parameters based on the received feedback frame, for example, to determine a steering matrix that can be used to steer one or more signals in the direction of the located client device. The beamforming parameters may include phase and/or amplitude settings for the transceivers 210 and 211, for example, to enable constructive and destructive interference on signals transmitted by the transceivers 210 and 211.

Next, the host device 200 operates an energy transmitter to convert a local power source to RF energy (530). In some implementations, the energy transmitter 215 or the energy transmitter 216 may generate a paging signal, one or more pre-charging pulses, and/or one or more data fields that may include a target ID.

Next, the host device 200 transmits RF energy (540). In some aspects, the RF energy provided by the energy transmitter 215 and/or the energy transmitter 216 may be transmitted by the transceivers 210 and 211 in accordance with the beamforming parameters determined at 520. In this manner, the RF energy may be transmitted and steered towards one or more client devices (such as in the direction of the located client devices). In some implementations, the transmitted RF energy may not be beamformed. Thus, operations 510, 520, and portions of 540 may be omitted to transmit RF energy to one or more client devices. In some other implementations, in response to a request for an RF energy transmission, the host device 200 may transmit a modified paging signal. The modified paging signal may be similar to the paging signals 405, 425, and 445 of FIGS. 4A, 4B, and 4C respectively. For example, the paging signals 405, 425, and 445 may be modified to omit data and only include the pre-charging energy pulses 410, 430, and 450 of FIGS. 4A-4C. In some other implementations, null data (zero data) may be included in the data fields 411, 431, and 451. In this manner, RF energy may be transmitted even when the paging signals 405, 425, and 445 do not include data for any particular client device.

Figure 6:
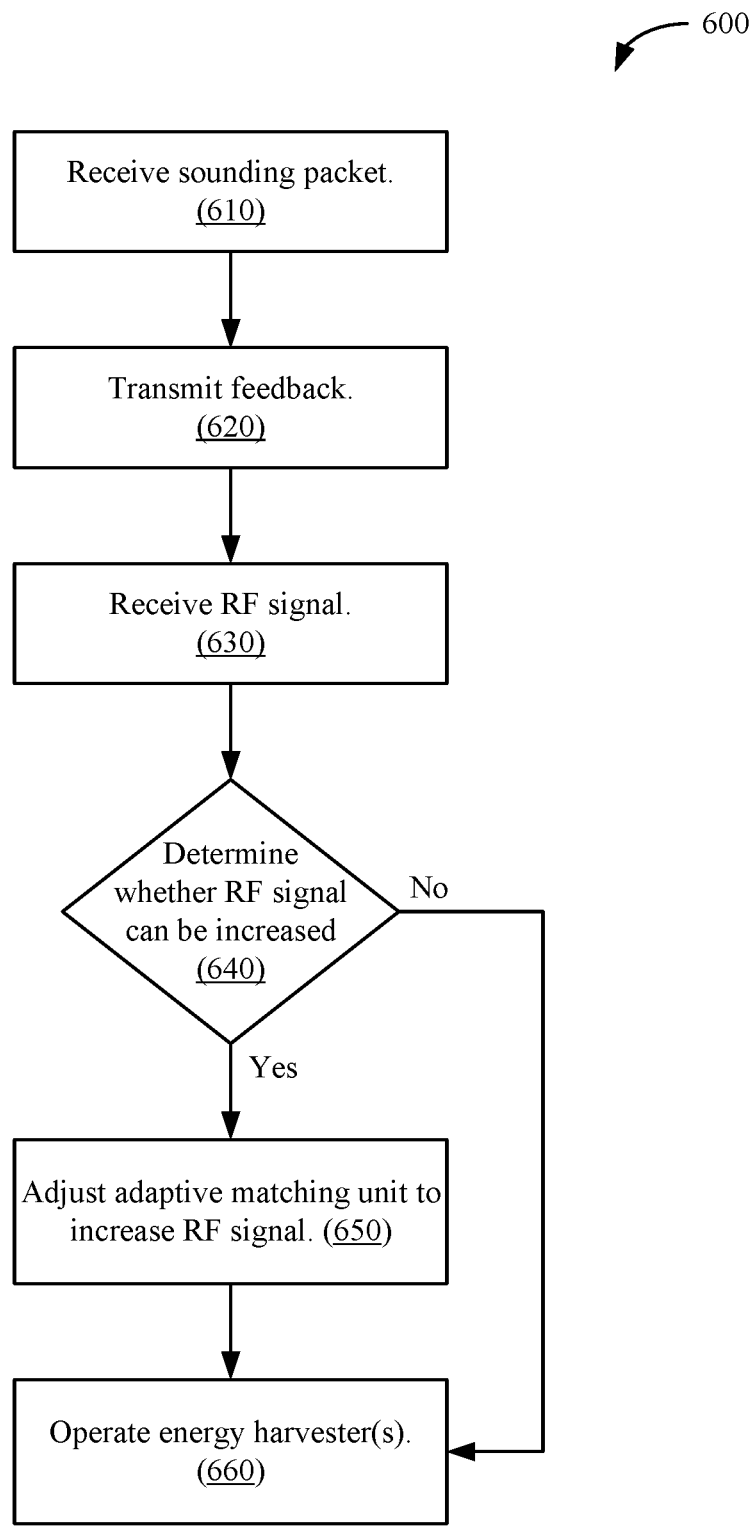
FIG. 6 is a flowchart depicting an example operation for operating a client device, in accordance with some embodiments.

FIG. 6 is a flowchart depicting an example operation 600 for operating a client device, in accordance with some embodiments. Although described herein as being performed by the client device 300 of FIG. 3, the operation 600 may be performed by the client device 120 or the client device 130 of FIG. 1, or by any other suitable device. The operation begins as the client device 300 receives one or more sounding packets from a host device (610). Next, the client device 300 may transmit feedback data (such as channel state information and/or feedback matrices) in response to the received sounding packets (620). Information included in the feedback data may enable the host device to determine a steering matrix that can be used to transmit a beamformed RF signal toward the client device 300. In some implementations, the feedback data may include a request for an RF energy transmission.

Next, the client device 300 receives an RF signal (630). In some implementations, the RF signal may be a paging signal including one or more RF pre-charging pulses and data fields. Next, the client device 300 may determine whether an amplitude of the received RF signal can be increased (640). In some aspects, the amplitude of the received RF signal may be increased by adjusting one or both of the adaptive matching units 313 and 314. Increasing the amplitude of the received RF signal may increase the efficiency of one or both of the associated energy harvesters 315 and 316.

If the amplitude of the received RF signal can be increased, then the client device 300 may adjust one or both of the adaptive matching units 313 and 314 to increase the amplitude of the received RF signal (650). In some implementations, the energy harvester 315 and/or the energy harvester 316 may generate control signals to increase the amplitude of the received RF signal. Next, the client device 300 may operate one or both of the energy harvesters 315 and 316 to convert the RF signal into power for the client device 300 (660). If the amplitude of the RF signal cannot be increased (as determined at 640), then the operation proceeds to 660 to operate one or both of the energy harvesters 315 and 316. In some implementations, the client device 300 may optionally combine and/or accumulate power from a plurality of energy harvesters using the power combiner and storage unit 330.

In some implementations, responding to sounding packets and/or increasing an amplitude of the received RF signal may be optional operations. Thus, one or more operations 610, 620, 640, or 650 may be omitted, and an RF signal may be received at 630 and converted into power at 660.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for operating a first wireless device, comprising:

determining a location of a second wireless device;
determining one or more beamforming parameters based on the determined location; and
beamforming a transmission of an on-off keying (OOK) modulated paging signal to the second wireless device based on the one or more beamforming parameters, the paging signal including a plurality of radio frequency (RF) pre-charging pulses for transmission during a first time period of the paging signal and a data field for transmission during a second time period of the paging signal subsequent to the first time period separate from the RF pre-charging pulses, the paging signal providing energy for harvesting by the second wireless device.

2. The method of claim 1, wherein the paging signal includes a target identification value to identify the second wireless device.

3. The method of claim 1, wherein the paging signal includes a target identification value encoded in the RF pre-charging pulses.

4. The method of claim 1, wherein determining the one or more beamforming parameters comprises:
transmitting a sounding packet;
receiving, from the second wireless device, feedback data based on the sounding packet; and
determining a beamforming steering matrix based at least in part on the feedback data.

5. The method of claim 1, wherein the RF pre-charging pulses are transmitted at a first power level, and the data field is transmitted at a second power level different from the first power level.

6. The method of claim 5, wherein the first power level is greater than the second power level.

7. A first wireless device comprising:
one or more processors; and
a memory configured to store instructions that, when executed by the one or more processors, cause the wireless device to:
determine a location of a second wireless device;
determine one or more beamforming parameters based on the determined location; and
beamform a transmission of an on-off keying (OOK) modulated paging signal to the second wireless device based on the one or more beamforming parameters, the paging signal including a plurality of radio frequency (RF) pre-charging pulses for transmission during a first time period of the paging signal and a data field for transmission during a second time period of the paging signal subsequent to the first time period separate from the RF pre-charging pulses, the paging signal providing energy for harvesting by the second wireless device.

8. The first wireless device of claim 7, wherein the paging signal includes a target identification value to identify the second wireless device.

9. The first wireless device of claim 7, wherein the paging signal includes a target identification value encoded in the RF pre-charging pulses.

10. The first wireless device of claim 7, wherein execution of the instructions causes the first wireless device to further:
transmit a sounding packet;
receive, from the second wireless device, feedback data based on the sounding packet; and
determine a beamforming steering matrix based at least in part on the feedback data.

11. The first wireless device of claim 7, wherein execution of the instructions causes the first wireless device to transmit the RF pre-charging pulses at a first power level, and to transmit the data field at a second power level different from the first power level.

12. The first wireless device of claim 11, wherein the first power level is greater than the second power level.

* * * * *